(12) United States Patent
Oleynik

(10) Patent No.: US 6,882,680 B1
(45) Date of Patent: Apr. 19, 2005

(54) QUADRATURE PHASE MODULATION RECEIVER FOR SPREAD SPECTRUM COMMUNICATIONS SYSTEM

(75) Inventor: Vladislav A. Oleynik, Chapel Hill, NC (US)

(73) Assignee: Umbrella Capital, LLC, Miami, FL (US)

( * ) Notice: Subject to any disclaimer, the term of this patent is extended or adjusted under 35 U.S.C. 154(b) by 659 days.

(21) Appl. No.: 09/591,196

(22) Filed: Jun. 9, 2000

(51) Int. Cl.[7] .................................................. H04B 1/69
(52) U.S. Cl. ........................ 375/147; 375/141; 375/267; 375/329; 375/376
(58) Field of Search .................................. 375/141, 147, 375/267, 329, 376; 327/47; 332/103; 329/315; 455/86

(56) References Cited

U.S. PATENT DOCUMENTS

| 4,829,543 A | * | 5/1989 | Borth et al. ................ 375/329 |
| 5,048,057 A | * | 9/1991 | Saleh et al. ................. 375/267 |
| 5,259,007 A | * | 11/1993 | Yamamoto .................. 375/376 |
| RE35,209 E | * | 4/1996 | Partyka et al. .............. 375/141 |
| 5,537,448 A | * | 7/1996 | Schwarz et al. ............ 375/376 |

* cited by examiner

Primary Examiner—Young T. Tse
Assistant Examiner—Edith Chang
(74) Attorney, Agent, or Firm—Jenkins, Wilson & Taylor, P.A.

(57) ABSTRACT

A quadrature phase modulation receiver for a spread spectrum communications system includes a mixer for mixing a received spread spectrum signal with a heterodyne signal to convert the frequency of the received signal to an intermediate frequency. A regulated oscillators module is coupled to the receiver for producing the heterodyne signal and signal equal to the intermediate frequency signal. A frequency multiplier circuit is coupled to the mixer for receiving the intermediate frequency signal and multiplying the frequency of the signal by a predetermined multiplication factor. An oscillator control signal is produced based on the frequency multiplied signal to maintain synchronization between the receiver and the transmitter.

22 Claims, 14 Drawing Sheets

QUADRATURE PHASE MODULATION RECEIVER FOR SPREAD SPECTRUM COMMUNICATIONS SYSTEM

The invention relates to spread spectrum (SS) communications systems. More particularly, the present invention relates to a receiver for use in spread spectrum communications systems.

RELATED ART

The communication technique known as spread spectrum was developed during World War II with the primary intent of protecting military and diplomatic communications. Spread spectrum communication techniques differ from conventional narrow-band communication techniques because they spread, rather than concentrate, transmitted signals over a wide frequency range. In other words, spread spectrum communication systems effectively spread a narrow-band information signal into a corresponding wide-band signal that closely resembles background radio frequency (RF) noise. Such noise-like characteristics are one of the great advantages of spread spectrum communication systems. That is, because spread spectrum signals are noise-like, they are difficult to detect and hence, there is an inherently high degree of security with SS type communication techniques. Consequently, SS has been and remains the communication technique of choice for many military applications. Without going into great detail, it should also be appreciated that, for similar reasons, SS signals are difficult to intercept and even more difficult to jam or interfere with than conventional narrow-band signals. Again, such exceptional low probability of intercept (LPI) and anti-jam (AJ) characteristics are the reasons that the military has used SS based communication systems for so many years.

Because spread spectrum signals have a high spectral width, the power spectral density (Watts per Hertz) of such signals is lower than that of conventional narrow-band signals. This lower transmitted power density characteristic is another significant advantage of SS communication systems, as SS and narrow band signals can occupy the same band, with little or no interference. Consequently, SS communication systems exhibit a high degree of immunity to interference generated by other equipment. As a result of this interference immunity, the Federal Communications Commission (FCC) and other international regulatory agencies allow RF equipment to transmit at higher power levels (i.e., longer range transmission) if spread spectrum transmission techniques are employed. Hence, all the commercial interest in SS communication systems today.

The expansion or widening of bandwidth in SS type communication systems is accomplished through the implementation of a pseudo-random sequence of binary information, known as a spreading code. The random quality of the spreading code is ultimately responsible for the noise-like appearance of the transmitted broadband SS signal. In reality, the binary sequence that comprises the spreading code is predictable, and consequently does repeat (hence the "pseudo" term). However, the randomness of the code is sufficient to minimize the possibility of accidental duplication or discovery, and as such the spreading code functions much like a security encryption key.

Spread Spectrum Modulation Techniques

With regard to spread spectrum type communication systems, the two most commonly employed signal-spreading techniques are direct sequencing and frequency-hopping. Both modulation techniques are characterized by wide frequency spectra and modulated output signals that occupy a much greater bandwidth than the information or baseband signal component. In general, to qualify as a spread spectrum signal, the transmitted signal bandwidth must be much greater than the information bandwidth, and a function, dependent on information other than the information being transmitted, must be employed to determine the transmitted bandwidth. Many commercial spread spectrum communication systems transmit an RF signal bandwidth as wide as 20 to 254 times the bandwidth of the information being sent. Some spread spectrum communications systems have employed RF bandwidths 1000 times their information bandwidth.

Direct sequence is perhaps one of the most widely known and utilized spread spectrum communications systems and it is relatively simple to implement, in that a narrow band carrier is modulated by a code sequence. More particularly, direct sequence spread spectrum (DSSS) systems are so called because they employ a high speed spreading code sequence, along with the basic information being sent, to modulate their RF carrier. The high speed spreading code sequence is used directly to modulate the carrier, thereby directly setting the transmitted RF bandwidth. Binary spreading code sequences as short as $2^4$ bits or as long as $2^{89}$ have been employed for this purpose, at code rates from under one bit per second to several hundred megabits per second. Direct sequence spectra vary somewhat in spectral shape depending upon the actual carrier and data modulation used. The most common signal modulation technique used in DSSS systems is known as binary phase shift keyed (BPSK) modulation. Using such a BPSK modulation scheme, the carrier phase of the transmitted signal is abruptly changed in accordance with the code sequence. Once again, as discussed above, it will be appreciated that the spreading code sequence is generated by a pseudo-random noise (PSN) generator and has a fixed length (i.e., after a given number of bits the code repeats itself exactly). The speed of the code sequence is called the chipping rate, measured in chips per second (cps). For direct sequence, the amount of spreading is dependent upon the ratio of chips per bit of information. At the receiver, the information is recovered by multiplying the incoming signal with a locally generated replica of the spreading code sequence. The result is a signal that is a maximum when the two signals exactly equal one another or are "correlated." The correlated signal is then filtered and sent to a BPSK demodulator.

Signals generated using this DSSS technique appear as noise in the frequency domain. The wide bandwidth provided by the spreading code allows the transmitted signal power to drop below the noise threshold without loss of information.

In another spread spectrum modulation scheme, known as frequency hopping (FH), the desired wide-band frequency spectrum is generated in a different manner. In the FH scheme, the carrier frequency of the transmitter abruptly changes (or hops) in accordance with a pseudo random spreading code sequence. The specific order in which frequencies are occupied is a function of the spreading code sequence, and the rate of hopping from one frequency to another is a function of the information rate. A frequency hopping spread spectrum receiver is capable of tracking these frequency changes and reproduces the original information signal.

Shown in FIG. 1 is a greatly simplified example of a typical direct sequence spread spectrum (DSSS) transmitter, generally indicated by the numeral 100. DSSS transmitter 100 includes an information signal 102 in the form of a serial sequence of binary digits. Also included is a pseudo-random noise (PSN) generator 104 that is responsible for reliably generating a fixed-length pseudo-random binary sequence known as the spreading code. A logic gate 106 that implements an exclusive-OR logic function is adapted to receive and logically process the information signal 102 and the spreading code produced by PSN generator 104. The output of the logic gate 106 is directed to a binary phase shift key (BPSK) modulator 108. BPSK modulator 108 also receives a signal from carrier oscillator 110. The modulated output of BPSK modulator 108 is amplified via RF power amplifier 112 and subsequently broadcast by antenna 114. As such, it will be appreciated that input information signal 102 is logically combined with a spreading code produced by PSN generator 104, and the resulting composite signal is provided as input to BPSK modulator 108. Modulator 108, with the aid of a carrier signal produced by carrier oscillator 110, encodes and modulates the composite signal using a BPSK modulating algorithm. The resulting BPSK modulated output signal is subsequently amplified via RF power amplifier 112 and broadcast from transmitter antenna 114.

Shown in FIG. 2 are samples of the initial, intermediate, and final waveforms generated by the DSSS transmitter 100 shown in FIG. 1. More particularly, FIG. 2 includes a sample waveform diagram 150 corresponding to a portion of the input information signal 102. Also included is another sample waveform diagram 152 corresponding to a portion of a spreading code sequence produced by PSN generator 104. Waveform diagram 154 illustrates a sample output of the XOR logic gate 106 corresponding to logical processing of the information waveform 150 and the spreading code waveform 152. Finally, waveform diagram 156 illustrates the broadband, BPSK modulated output signal produced by the BPSK modulator 108.

Shown in FIG. 3 is a simplified example of a typical direct sequence spread spectrum (DSSS) receiver, generally indicated by the numeral 120. DSSS receiver 120 includes a receiving antenna 122, a broadband RF amplifier 124, and a first signal mixer 126. Signal mixer 126 is adapted to receive an amplified broadband signal from amplifier 124 as well as a signal generated by a local oscillator 128 having a frequency equal to $f_c-f_{IF}$, where $f_c$ is the carrier frequency and $f_{IF}$ is the intermediate frequency. The output signal produced by mixer 126 is then compared at a second mixer 130 to a signal that is generated by a third mixer 132. The signal generated by mixer 132 is produced using the same spreading code sequence as that used by the corresponding DSSS transmitter 100 shown in FIG. 1. This spreading code sequence is generated in much the same manner as described above for transmitter 100. That is, a PSN generator 134 and associated clock function 136 are used to create the binary spreading code sequence. More particularly, the binary spreading code sequence produced by PSN generator 134 is combined with an IF carrier signal that is produced by an IF oscillator 138. It will be further appreciated that the signal output by the correlating mixer 130 is used to drive a synchronization circuit 140, which in turn is responsible for ensuring that the IF carrier signal generated by oscillator 138 is synchronized with carrier oscillator 110 of transmitter 100. That is, synchronization circuit 140 must reproduce the exact phase and frequency of the signal output from carrier oscillator 110. Synchronization circuit 140 performs this function, in part, by altering the frequency of clock source 136 such that the PSN or spreading code chip rate matches that of the incoming modulated broadband signal. Since the spreading code produced by the PSN generator is the same as that contained within the received signal, adjusting the clock in the manner described above will eventually allow the two signals to be brought into a synchronized state.

Again, it will be appreciated that the spreading code produced by PSN generator 134 is used to modulate the IF carrier produced by oscillator 138 at mixer 132. This spreading code modulated IF carrier output of mixer 132 is subsequently provided as one input to the correlating mixer 130. Again, it will be appreciated that the output of mixer 132 is a BPSK modulated signal that is similar to the received broadband signal. This BPSK modulated signal produced by mixer 132 is compared to the received broadband signal in mixer 130, which effectively acts as a correlator. The output of the correlating mixer 130 is then filtered via a low pass filter (LPF) 142 so as to recover the original sequence of binary information sent by transmitter 100.

Synchronization Problems of Conventional Spread Spectrum Receivers

In both direct sequence and frequency hopping spread spectrum communications systems, the receiver must extract the information signal from the received RF signal. In order to exact the information signal, the IF oscillator at the receiver must be synchronized with the carrier oscillator at the transmitter. In FIG. 3, this synchronization is performed based on the BPSK signal. Because the BPSK signal phase changes based on the transmitted information, the control signals output from synchronization circuits 140 also vary with the transmitted information. As a result, synchronization between the oscillators at the transmitter and receiver cannot be reliably achieved.

FIG. 4 illustrates an example of another type of conventional spread spectrum receiver in which there is no feedback to the local oscillator at the receiver. In FIG. 4, the spread spectrum receiver includes an antenna 400, a pre-selector 402, a mixer 404, and a phase discriminator 406 connected in series. An oscillator module 408 is connected to mixer 404 and phase discriminator 406.

Antenna 400 receives the signal transmitted from the transmitter (not shown in FIG. 4). Pre-selector 402 is a bandpass amplifier that amplifies the received signal over a predetermined frequency band. Mixer 404 mixes the received signal with one signal output from oscillator module 408. Phase discriminator 406 outputs a signal that is proportional to the phase difference between the IF signal output from mixer 404 and the IF signal output from the second output from oscillator module 408. Additional modules that are not shown in FIG. 1 may be used to remove the spreading code from the signal output from phase discriminator 406.

FIG. 5 illustrates yet another conventional receiver that includes all of the modules illustrated in FIG. 4 and, in addition, a frequency and phase adjustment module 500. Frequency and phase adjustment module 500 receives the output signal from mixer 404. Frequency and phase adjustment module 500 produces a control signal that is fed back to an oscillator module 408a. The purpose of the control signal is to correct the phase and frequency of the IF signal output from oscillator 408 so that the IF signal is synchronized with the carrier oscillator of the transmitter.

In the spread spectrum receiver illustrated in FIG. 5, phase adjustment cannot be made fine enough because of the influence of the phase changes in the received signal due to the transmitted information. Phase modulation, e.g., BPSK, QPSK, etc., on the transmitter side result in nonconherence of the received signal. Existing methods for generating the oscillator module control signal are not able to avoid the influence of phase changes in the received signal caused by the transmitted information. As a result, the signal output from local oscillator 408a does not remain in phase with the received signal and demodulation becomes impossible.

FIG. 6 illustrates yet another conventional spread spectrum receiver. In FIG. 6, the spread spectrum receiver includes an antenna 400, a pre-selector 402, a mixer 404, and a phase discriminator 406 connected in series. An oscillator module 408a is connected to mixer 404 and phase discriminator 406. These components and connections are the same as the corresponding components and connections described above with respect to FIGS. 4 and 5. Hence, a description thereof is not repeated herein.

The spread spectrum receiver illustrated in FIG. 6 also includes a demodulated signal processing module 600. Demodulated signal processing module 600 is connected to the output of phase discriminator 406 to remove the spreading code from the received signal. Since phase discriminator 406 effectively removes the carrier from the received signal, the output of demodulated signal processing module 600 is the information signal.

In addition to removing the spreading code, demodulated signal processing module 600 also produces a control signal for adjusting the IF signal output from regulated oscillators module 408a. However, like the conventional receiver illustrated in FIG. 3, this control signal is susceptible to changes based on the transmitted information. As a result, maintaining synchronization is difficult.

An example of a spread spectrum signal receiver in which the control signal for adjusting the receiver oscillator is produced by the demodulated signal processing module 600 is the PRISM® II receiver available from Intersil Corporation. The PRISM® II receiver is a quadrature phase modulation receiver marketed for use in wireless local area networks (LANs). However, the Intersil receiver has the following disadvantages:

When the frequency and phase difference between the local oscillators of the transmitter and the receiver varies, there is high probability of losing connection. In addition, restoration of synchronization after losing the connection is also difficult when the IF signal output from local oscillator is unstable.

A long uninterrupted connection using the Intersil receiver is problematic due to the large adjustment time constant using the selected method of phase adjustment using the demodulated signal output from demodulated signal processing module 600.

Accordingly, there exists a need for a novel quadrature phase modulation receiver that avoids at least some of the difficulties associated with conventional receivers.

DISCLOSURE OF THE INVENTION

A phase modulation spread spectrum receiver maintains synchronization with a phase modulation spread spectrum transmitter by removing the influence of the transmitted information from the intermediate frequency produced by the local oscillator at the receiver. In order to remove this influence, a frequency multiplier receives the IF signal produced by the down converter at the receiver and multiplies the frequency of the signal by a predetermined multiplication factor, which is preferably equal to four. Once the IF signal has been frequency-multiplied, the influence of the transmitted information is removed. This signal can then be used to adjust the frequency of the receiver oscillator.

A phase modulation spread spectrum receiver according to the invention can be implemented in hardware, software, or a combination of hardware and software. Accordingly, some aspects of the invention may be implemented as computer program products comprising computer executable instructions in a computer readable medium.

Accordingly, it is an object of the invention to provide a spread spectrum receiver capable of reliably maintaining synchronization with the transmitter.

It is yet another object of the present invention to provide a spread spectrum receiver in which phase fluctuations in the received signal due to the data content of the received signal do not affect the reference frequency of the phase discriminator which is equal to the intermediate frequency.

It is yet another object of the invention to reduce the time constant for adjusting the intermediate frequency signal.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of preferred embodiments of the invention will now proceed with reference to the accompanying drawings of which.

DETAILED DESCRIPTION OF THE INVENTION

Figure 1:
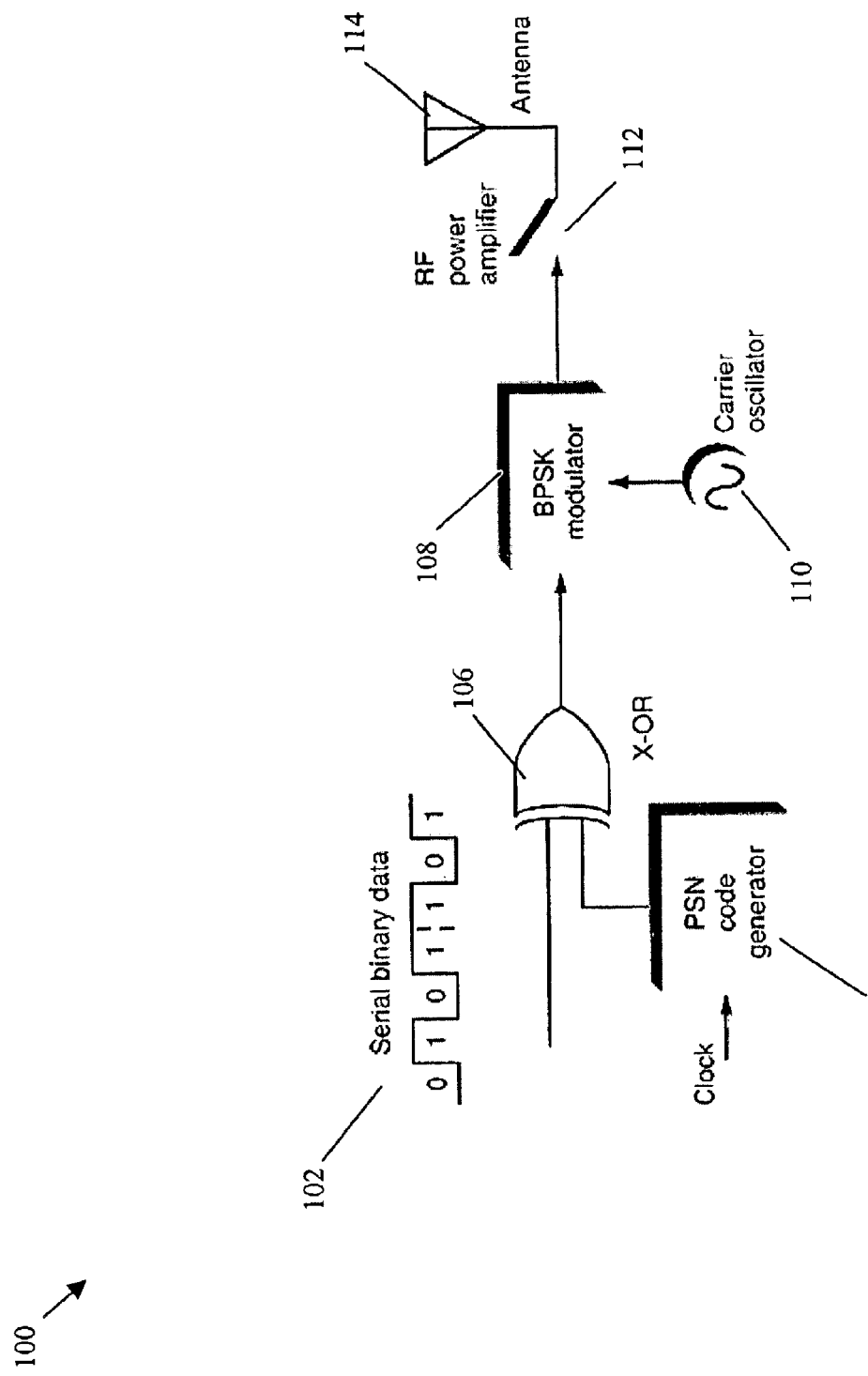
FIG. 1 is a block diagram of a conventional spread spectrum transmitter.
Figure 2:
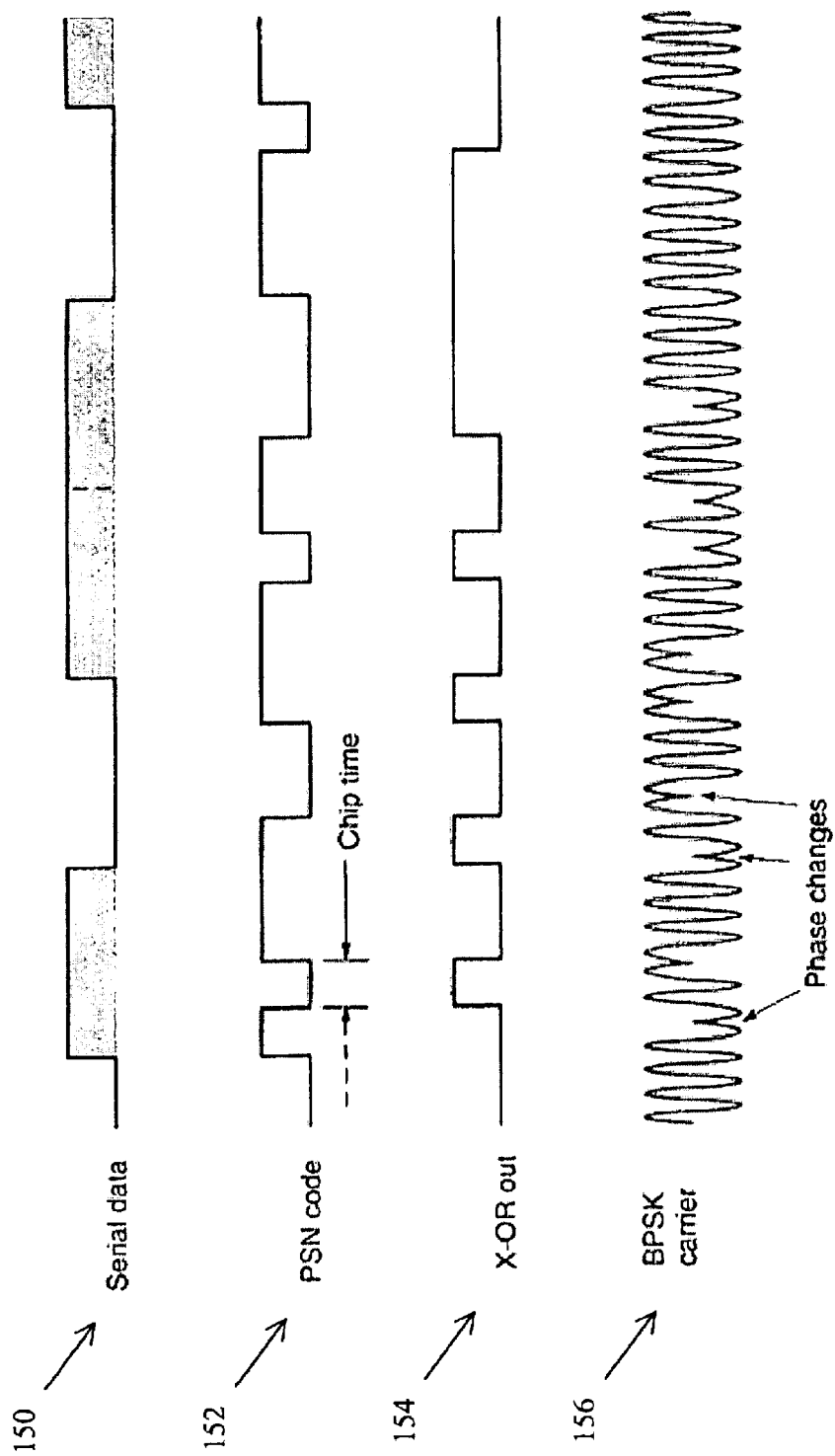
FIG. 2 is a timing diagram illustrating conventional spread spectrum modulation techniques.
Figure 3:
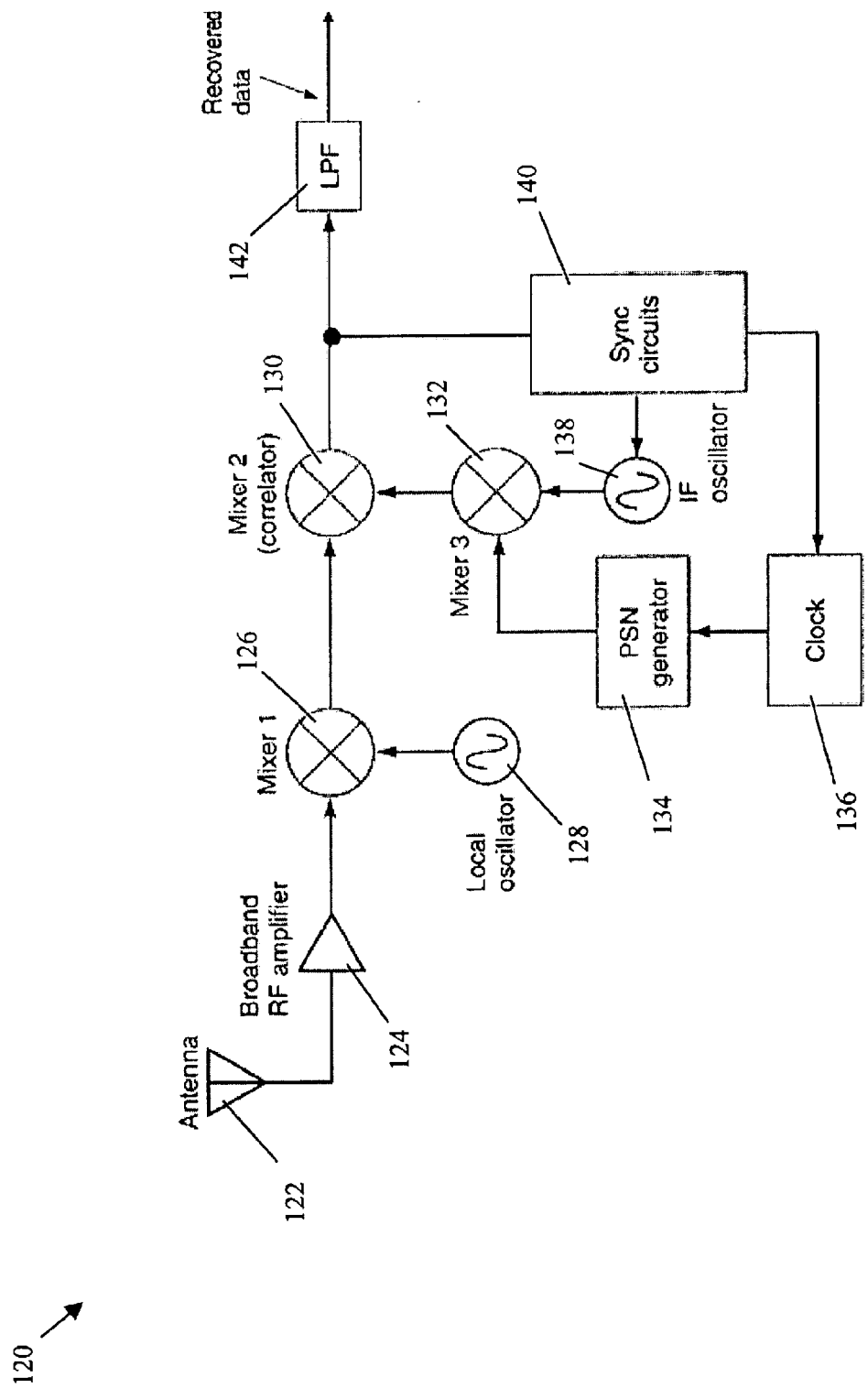
FIG. 3 is a block diagram of a conventional spread spectrum receiver.
Figure 4:
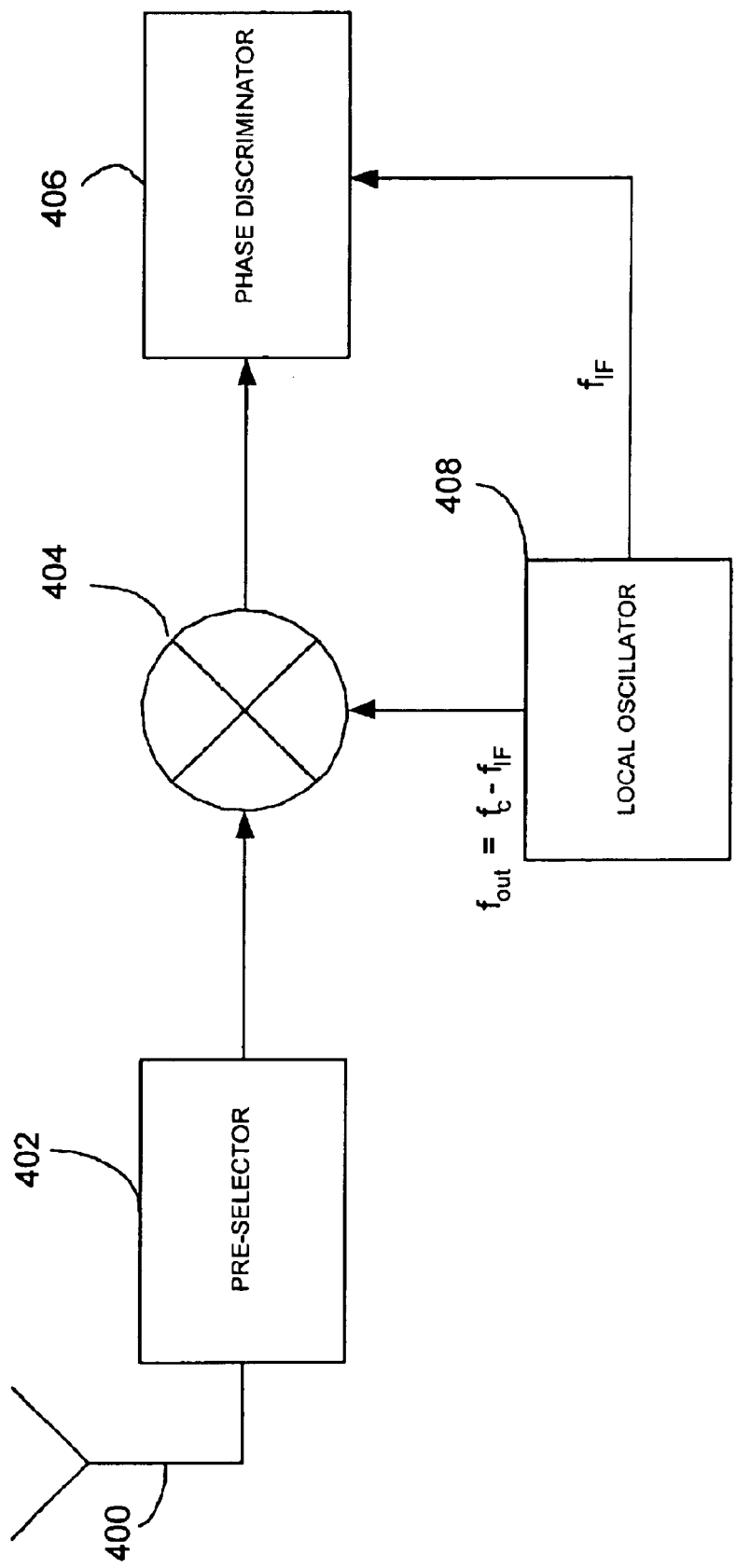
FIG. 4 is a block diagram of another conventional spread spectrum receiver.
Figure 5:
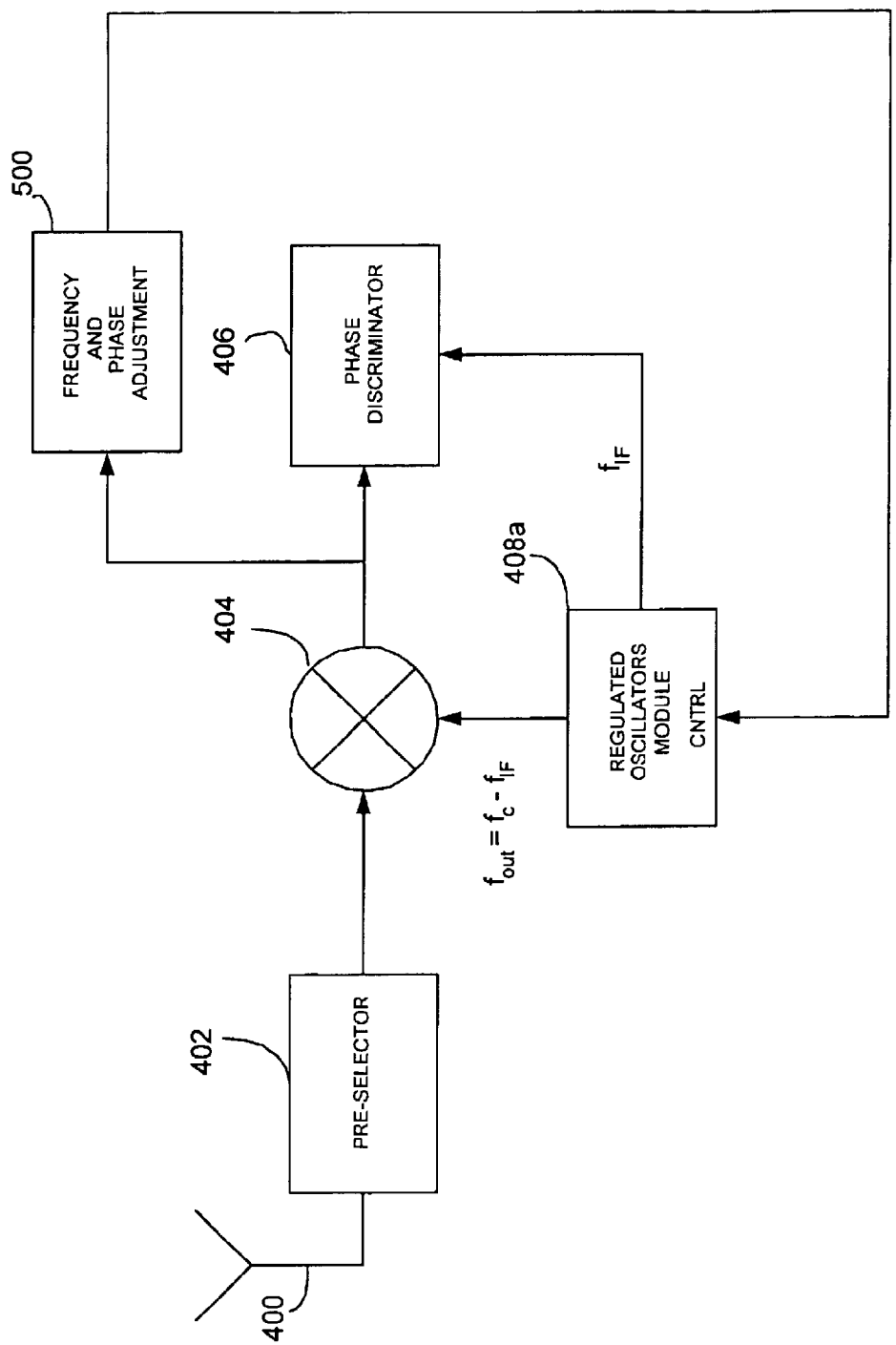
FIG. 5 is a block diagram of yet another conventional spread spectrum receiver with a frequency and phase adjustment module for adjusting the phase and frequency of the intermediate signal output from the local oscillator.
Figure 6:
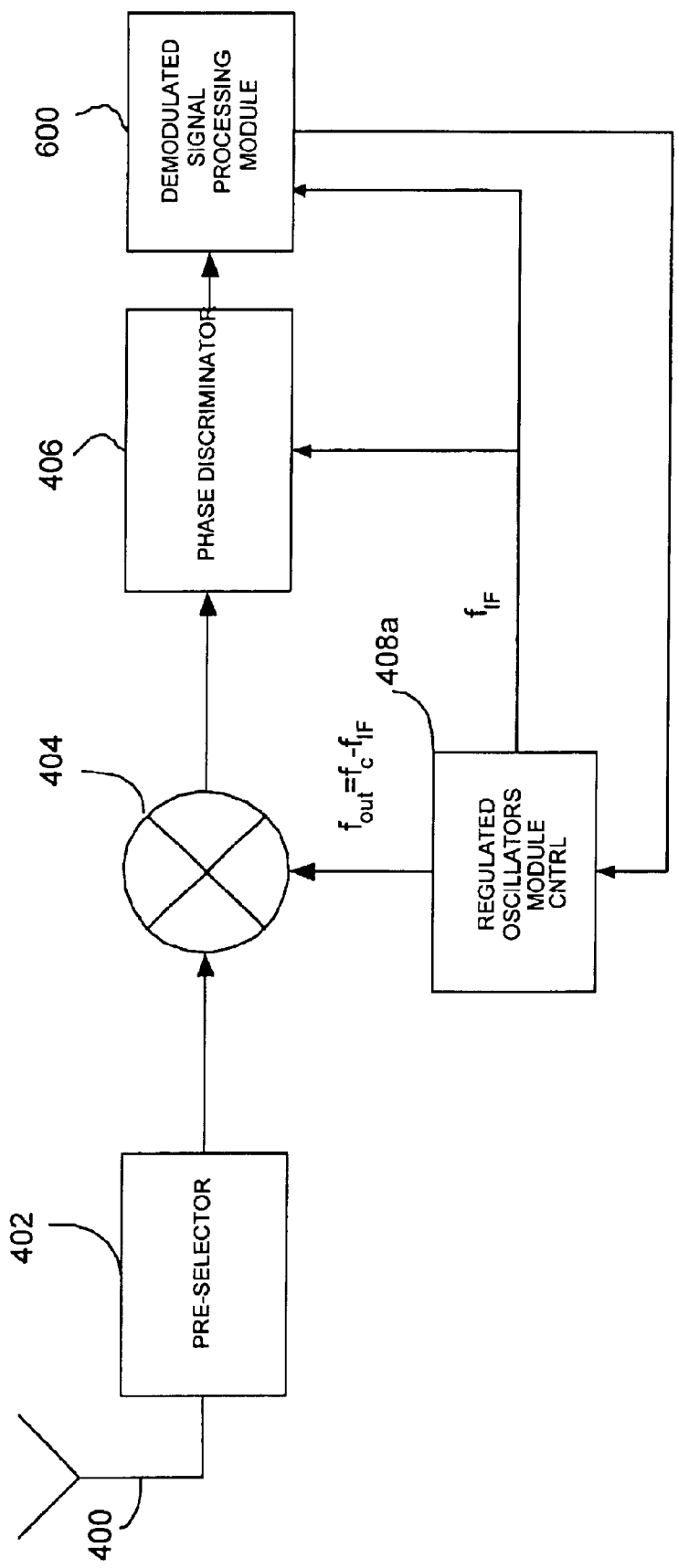
FIG. 6 is a block diagram of yet another conventional spread spectrum receiver in which phase adjustment of the received signal is based on the demodulated signal output from a demodulated signal processing module.
Figure 7:
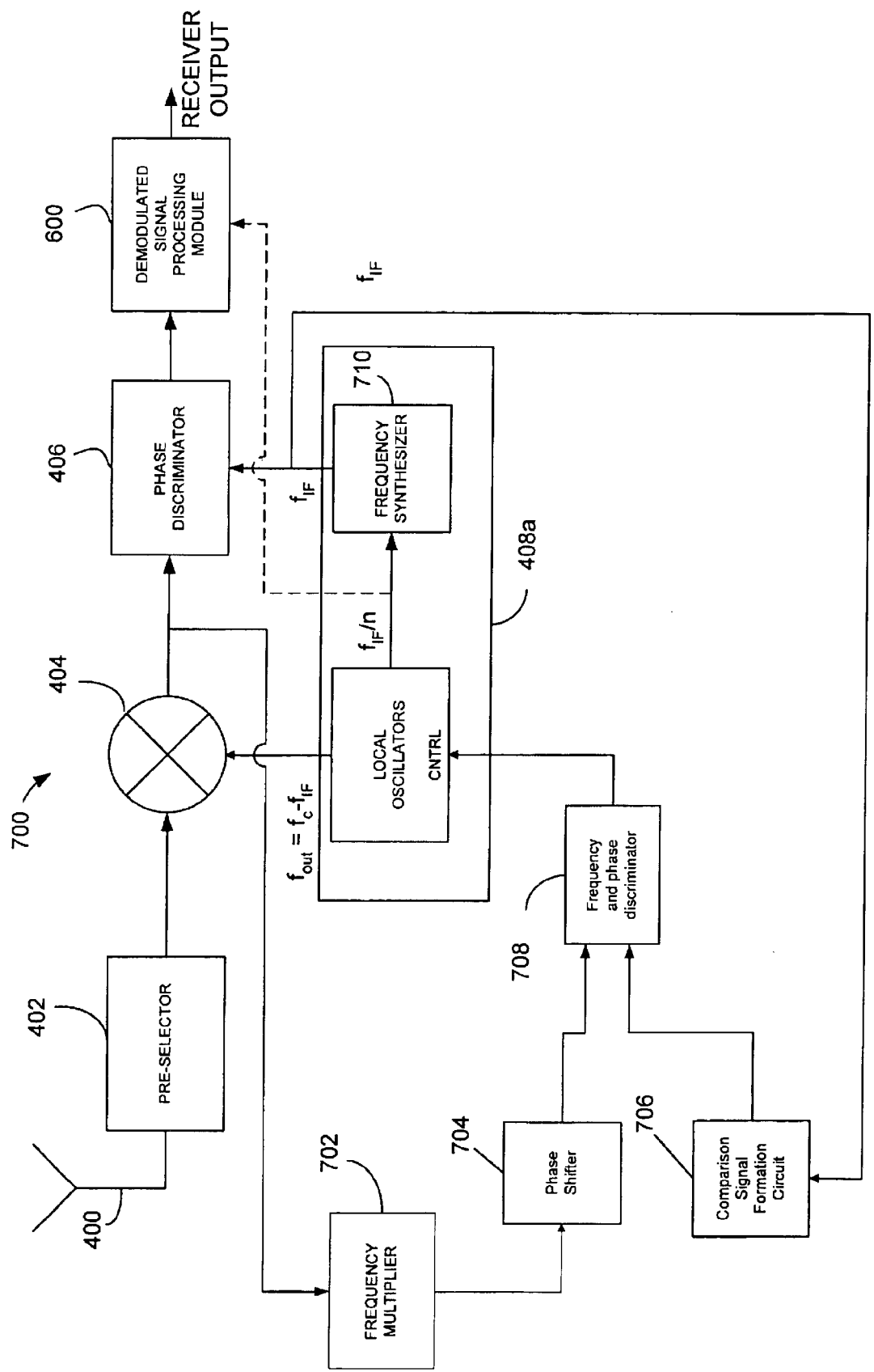
FIG. 7 is a block diagram of a phase modulation spread spectrum receiver according to an embodiment of the present invention.

FIG. 7 is a block diagram of a spread spectrum receiver according to an embodiment of the present invention. In FIG. 7, spread spectrum signal receiver 700 includes an antenna 400, a pre-selector 402, a mixer 404, a phase discriminator 406, and a demodulated signal processing module 600. These components are the same as the correspondingly-numbered components described above with respect to FIGS. 1–6. However, in order to provide a complete description of the invention, these components and the connections between these components will now be discussed in detail.

Antenna 400 is connected to the input of pre-selector 402. Antenna 400 may be a Yagi antenna or any other type of antenna capable of receiving a spread spectrum signal. The structure of the antenna depends on the range of frequencies that are desired to be received. In the United States, the Federal Communications Commission (FCC) has allocated three frequency bands for spread spectrum communications: 902–928 MHz, 2.4000–2.4835 GHz, and 5.725–5.850 GHz. Accordingly, antenna 400 may be adapted to receive signals in one or more of these frequency bands. However, the present invention is not limited to receiving signals only in these frequency bands. Receiving spread spectrum signals in any frequency band allocated for such signals is within the scope of the invention.

Pre-selector 402 may be a bandpass filter for performing initial frequency selection of the received signal. Bandpass filters suitable for use with embodiments of the present invention include active filters and Butterworth bandpass filters having upper and lower cutoff frequencies that correspond to the desired spread spectrum frequency band.

The output of pre-selector 402 is connected to the first input of mixer 404. Mixer 404 may be any type of mixer capable of frequency mixing two or more signals. For example, a mixer suitable for use with embodiments of the present invention may include a continuously variable transconductance device, such as a dual gate field effect transistor (FET). In such a device, the output voltage may be the frequency-converted input signal. The input voltage at one of the gates may be the receiver input signal. The input voltage at the other gate may be the frequency of the heterodyne signal output from a regulated oscillators module 408a. Such a multiplier is preferably of the four quadrant type so that multiplier action is obtained regardless of the sign of the received input signal and the frequency of the heterodyne signal.

The output of mixer 404 is connected to the input of phase discriminator 406 and frequency multiplier 702. Phase discriminator 406 also receives the IF signal output from a frequency synthesizer, generally designated 710.

Figure 8:
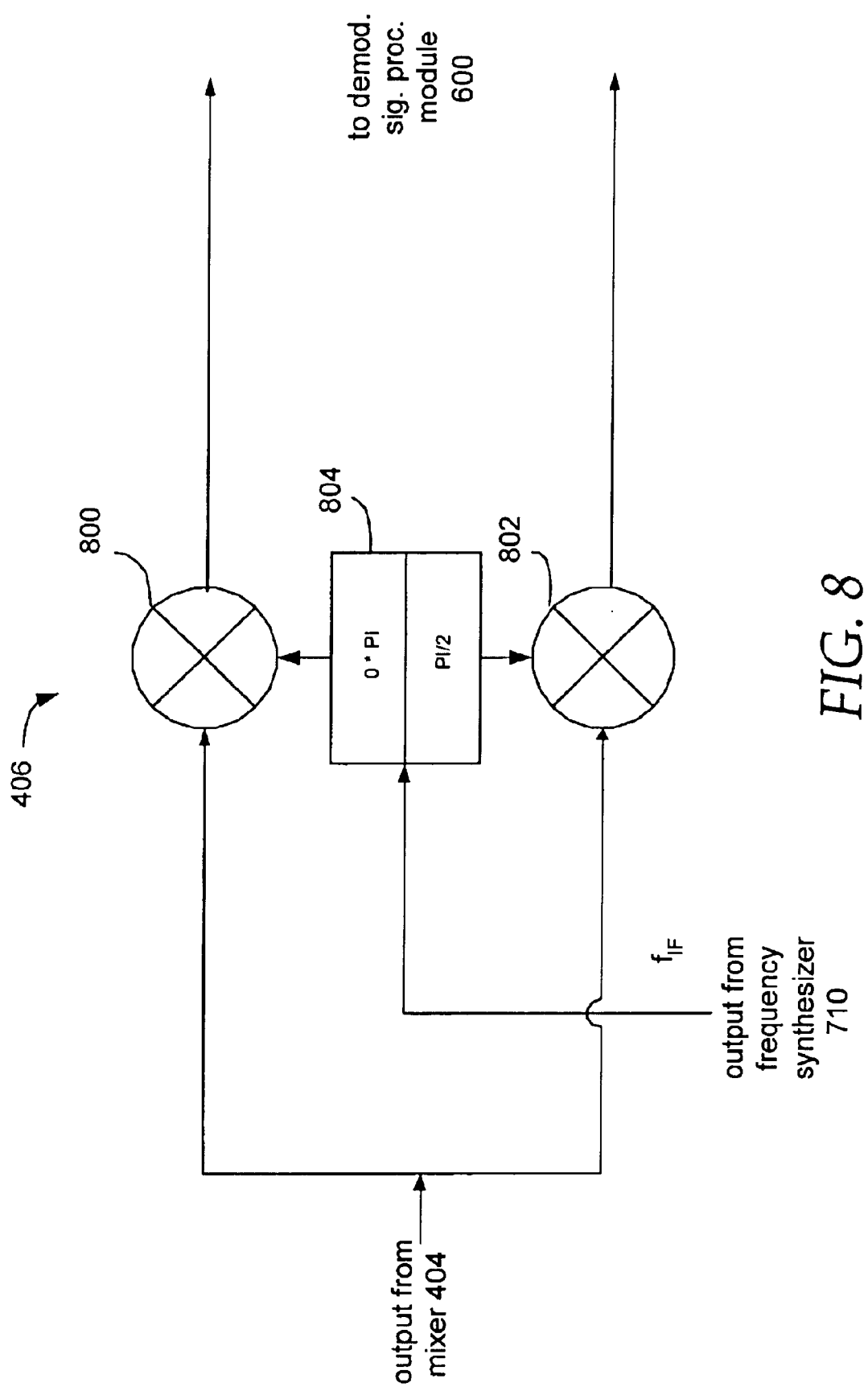
FIG. 8 is a block diagram of a phase discriminator suitable for use in the phase modulation spread spectrum receiver illustrated in FIG. 7.

FIG. 8 illustrates an exemplary phase discriminator 406 suitable for use with embodiments of the present invention. In FIG. 8, phase discriminator 406 includes mixers 800 and 802 and phase shifter 804. Mixers 800 and 802 mix the signal output from mixer 404 illustrated in FIG. 7 with a frequency multiplied signal output from frequency synthesizer 710. More particularly, mixer 802 mixes a phase-shifted version the frequency multiplied signal with the signal output from mixer 404, and mixer 800 mixes a non-phase-shifted version of the frequency multiplied signal with the signal output from mixer 404. The reason that the signal having a frequency output from mixer 404 is mixed with the frequency-multiplied signal having a frequency equal to the intermediate frequency is to provide quadrature demodulation. The outputs from mixers 800 and 802 are input to demodulated signal processing module 600 illustrated in FIG. 7.

The reason that the signal output from mixer 404 is mixed with both a phase-shifted and a non-phase-shifted version of the frequency-multiplied signal output from frequency synthesizer 710 is that in the module 406, quadrature de-modulation is being performed, which requires two frequencies as references for demodulation. The signal outputs from mixers 800 and 802 are combined in the bus connecting phase discriminator 406 and demodulated signal processing module 600. The signal produced by phase discriminator 406 is output to demodulated signal processing module 600 for de-spreading. The signal output from phase discriminator 406 is a PSN code similar to PSN code 154 illustrated in FIG. 2.

Demodulated signal processing module 600 illustrated in FIG. 7 can be adapted to demodulate a frequency hopping spread spectrum signal, a direct sequence spread spectrum signal, as well as other types of spread spectrum signals. Thus, the present invention is not limited to any particular type of spread spectrum demodulation. Any type of spread spectrum demodulator is intended to be within the scope of the invention. Exemplary spread spectrum demodulators suitable for use with embodiments of the present invention include model numbers HFA3824 and HFA3860 available from Intersil Corporation.

Referring again to FIG. 7, components 400, 402, 404, 408a, 406, and 600 are conventional components of a spread spectrum receiver and may cause loss of synchronization between the sender and the receiver due to variations in the intermediate frequency signal output from regulated oscillators module 408a. However, according to the present embodiment, frequency multiplier 702 removes the influence of data changes in the received signal from the synchronization signal input to phase discriminator 406.

Frequency multiplier 702 receives the signal output from mixer 404 to multiply it by a predetermined multiplication factor. For a quadrature phase modulation receiver, the multiplication factor of frequency multiplier 702 is preferably set to four. Setting the multiplication factor to four removes the influence of data changes in the received signal from the synchronization signal input to phase discriminator 406. However, the present invention is not limited to a multiplication factor of four. Any other multiplication factor that reduces or removes the influence of data changes in the received signal from the synchronization signal is within the scope of the invention.

Multiplying the signal output from mixer 404 by a factor of four may be accomplished, for example, by squaring the signal power of the IF signal twice using standard power multipliers. Squaring the signal power may be accomplished by simultaneously applying the signal to both inputs of a first power multiplier, filtering the constant part of the resulting signal, passing the signal through a DC blocking capacitor, squaring the filtered signal by simultaneously applying the signal to both inputs of a second power multiplier, and filtering the constant part of the resulting signal.

Figure 9:
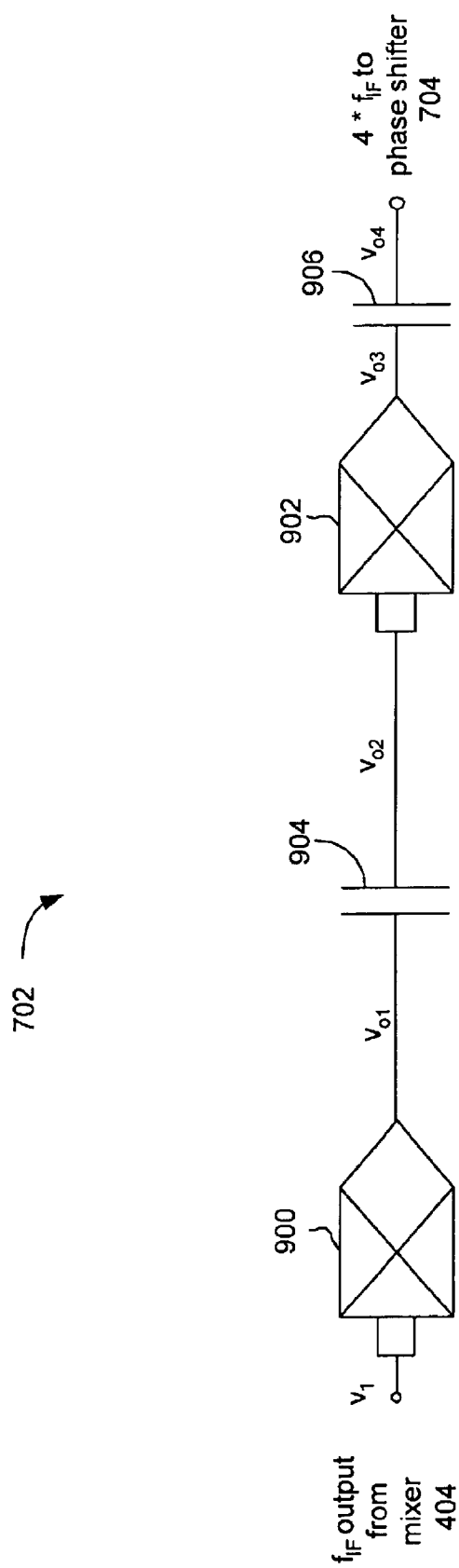
FIG. 9 is a schematic diagram of a frequency multiplier circuit suitable for use with the phase modulation spread spectrum receiver illustrated in FIG. 7.

FIG. 9 is a schematic diagram of a frequency multiplier suitable for use with embodiments of the present invention. In FIG. 9 frequency multiplier 702 comprises first and second power multipliers 900 and 902 and first and second DC blocking capacitors 904 and 906. Power multipliers 900 and 902 are standard circuits that multiply the signals at the input terminals. The internal details of such circuits are generally known to one of ordinary skill in the power electronics art and need not be described herein. What is important for purposes of the present invention is that the signal at the output terminals of each multiplier is the product of the voltages at the input terminals. In other words:

$$v_{o1} = (v_1)^2 + k_1.$$

The signal $v_{o2}$ applied to the input terminals of power multiplier 902 is equal to $v_{o1}$ without the DC component, due to the action of DC blocking capacitor 904. In other words, $$v_{o2}=(v_1)^2$$

Power multiplier 902 squares the signal $v_{o2}$ to produce the signal $v_{o3}$. The relationship between $v_{o2}$ and $v_{o3}$ is as follows:

$$v_{o3}=(v_{o2})^2+k_2$$

Capacitor 906 removes the DC component $k_2$ from the signal $v_{o3}$ to produce the signal $v_{o4}$. $v_{o4}$ is thus equal to the square of $v_{o2}$, which is equal to the square of the input signal. In other words, $$v_{o4}=(v_1)^4.$$

Squaring an input signal, filtering the constant component, squaring the resulting signal and filtering the constant component from the resulting signal has the effect of multiplying the frequency of the input signal by four. This effect will be discussed in more detail below.

The present invention is not limited to using a power multiplier to increase the frequency of the signal output from mixer 404. Other schematics achieving the same results or equivalent results are within the scope of the invention. The $4^{th}$ harmonic must be obtained from the combinations frequencies, in particular by multiplying signals by themselves.

Once the frequency of the signal output from the frequency multiplier 702 is multiplied by four, the signal will have no components dependent on the modulating signal, which, in this example, changes the phase of the received signal in multiples of PI/2, i.e., (3.1416 . . . )/2, since quadrature phase modulation is used. The proof of the independence of the phase of the resulting signal from the modulating signal is illustrated by the following mathematical equations.

A signal with quadrature phase modulation after passing the pre-selector 402 and the mixer 404 can be represented by the following expression:

$$U(t)=A \sin(\omega t+\phi)+B \cos(\omega t+\phi), \quad (1)$$

where $\omega$ is the frequency of the signal, which is equal to the immediate frequency, $\phi$ is the initial phase of the signal, which does not depend on the modulating signal, and A, B are amplitude coefficients with possible values of 1 and −1. These coefficients determine the dependency of the phase of the received signal on the modulating signal.

After squaring the signal, the following expression is obtained:

$$U^2(t)=(A \sin(\omega t+\phi)+B \cos(\omega t+\phi))^2=A^2 \sin^2(\omega t+\phi)+B^2 \cos^2(\omega t+\phi)+2AB \sin(\omega t+\phi)\cos(\omega t+\phi). \quad (2)$$

In light of the following trigonometric identities:

$2 \sin^2 a = 1 - \cos 2a,$ $2 \cos^2 a = 1 + \cos 2a,$ and $2 \sin a \cos b = \sin(a-b) + \sin(a+b),$ expression (2) can be rewritten as $$U^2(t)=A^2(1-\cos(2\omega t+2\phi))/2+B^2(1+\cos(2\omega t+2\phi))/2+AB(\sin 0+\sin(2\omega t+2\phi)). \quad (3)$$

As stated above, the constants A and B have values of ±1 in accordance with the modulating signal. Thus, $A^2=B^2=1$. Expression (3) reduces to:

$$U^2(t)=1+AB \sin(2\omega t+2\phi). \quad (4)$$

After filtering out the constant component, the signal output from the first stage of frequency multiplier 702 can be represented as:

$$U^2(t)=AB \sin(2\omega t+2\phi). \quad (5)$$

After the second squaring, the following expression is obtained:

$$U^4(t) = A^2 B^2 \sin^2(2\omega t + 2\varphi) \quad (6)$$

$$= A^2 B^2 (1 - \cos(4\omega t + 4\varphi))/2$$

$$= \frac{1}{2} - (\cos(4\omega t + 4\varphi))/2.$$

After filtering out the constant component the signal can be represented by the following expression:

$$U^4(t)=-(\cos(4\omega t+4\phi))/2. \quad (7)$$

The signal represented by equation (7) is an output signal of the frequency multiplier 702. From equation (7), the phase of the signal does not depend on the modulating signal, and the frequency is equal to the intermediate frequency multiplied by four. Because the influence of the modulating signal is removed, the frequency multiplied signal can be used to demodulate the received signal with a reduced likelihood of losing synchronization with the received signal.

Referring back to the block diagram illustrated in FIG. 7, output from the frequency multiplier 702 is input to the first input of the frequency and phase discriminator 708 through the phase shifter 704. The output signal $f_{IF}$ from the frequency synthesizer 710 is input to comparison signal formation circuit 706. The second input of the frequency and phase discriminator 708 receives the output signal from the comparison signal formation circuit 706. The frequency and phase discriminator 708 produces a control signal for regulating the intermediate frequency signal output from regulated oscillators module 408*a*.

As stated above, phase shifter 704 receives the signal output from the frequency multiplier 702. Phase shifter 704 shifts the phase of the signal by a factor of PI/2. The reason for shifting the signal output from mixer 404 by a factor of PI/2 is to provide the required phase shift for signal synchronization in phase autocorrelation of the signal performed by the phase and frequency discriminator 708 and to compensate for the phase shift between the input synchronization signal from the output of mixer 404 and the VCO signal output from regulated oscillators module 408*a*.

Figure 10:
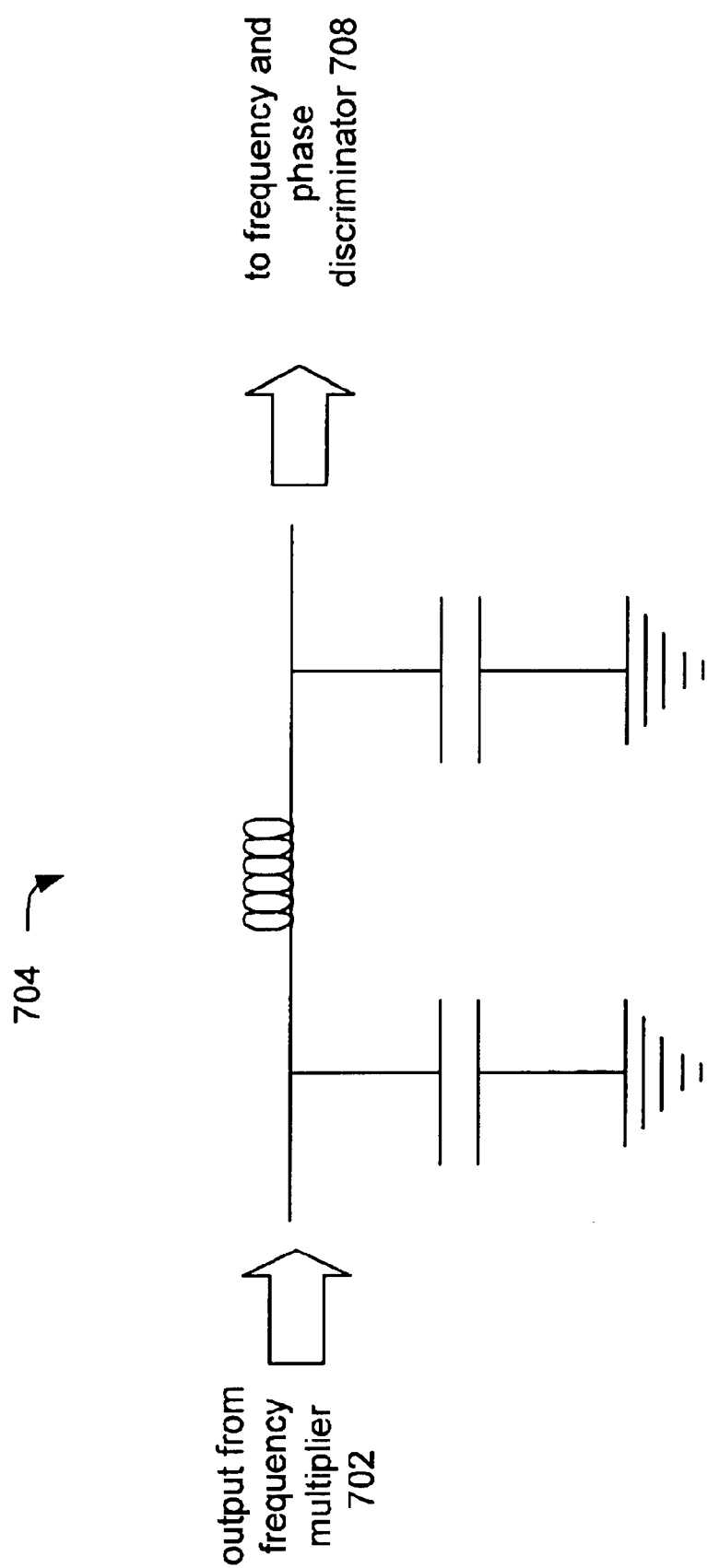
FIG. 10 is a schematic diagram of a phase shifter circuit suitable for use with the phase modulation spread spectrum receiver illustrated in FIG. 7.

FIG. 10 is a block diagram of an exemplary phase shifter suitable for use with embodiments of the present invention. In the illustrated embodiment, phase shifter 704 comprises a tuned circuit that shifts the phase of the input signal by ninety degrees. The tuned circuit includes both capacitive and inductive elements, which may be distributed or discrete components. The values of the inductive and capacitive elements are preferably chosen such that phase shifter 704 functions as a quarter-wave transformer of the input signal. A quarter-wave transformer produces a PI/2 phase shift of the signal having the intermediate frequency multiplied by four between its input and output terminals and can be readily formed using microstrip line or discrete components.

Figure 11:
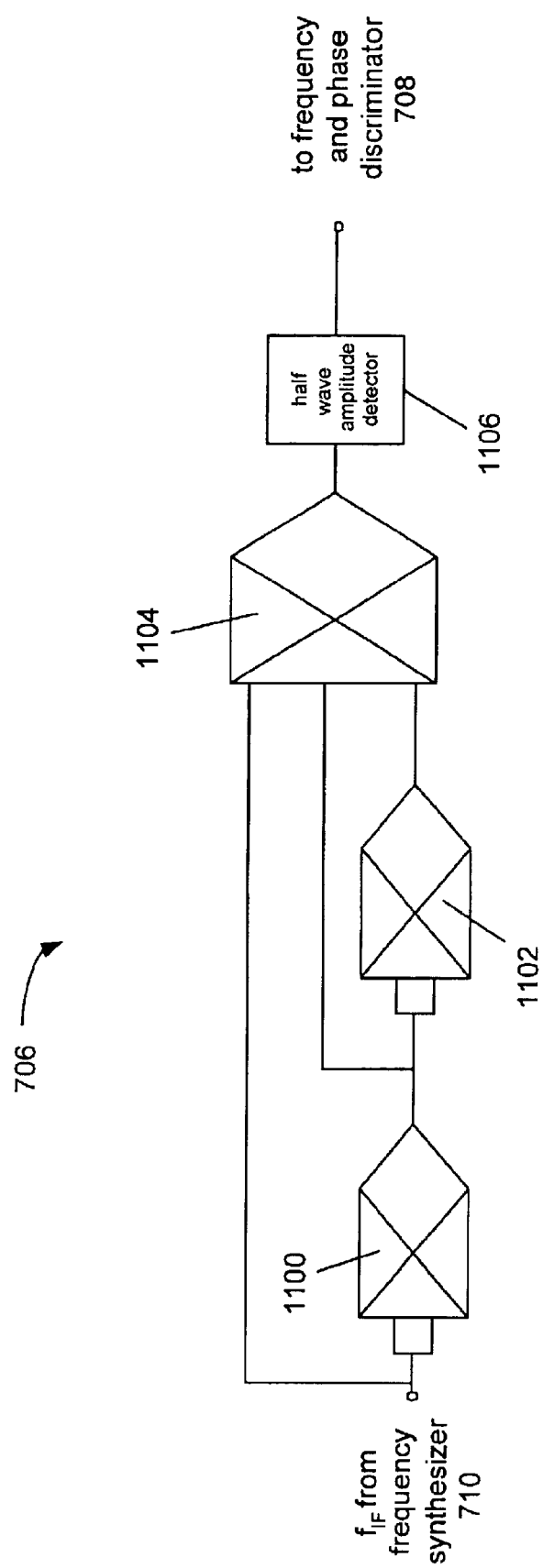
FIG. 11 is a partial schematic/partial block diagram illustrating a comparison signal generation circuit suitable for use with the phase modulation spread spectrum receiver illustrated in FIG. 7.

Comparison signal formation circuit 706 receives a signal having the frequency $f_{IF}$ from the frequency synthesizer 710 and produces a control signal to be input to frequency and phase discriminator 708. FIG. 11 illustrates an example of a comparison signal formation circuit suitable for use with embodiments of the present invention. In the illustrated embodiment, comparison signal formation circuit 706 comprises first and second signal squaring circuits 1100 and 1102, a three-input multiplier 1104, and a half-wave amplitude detector 1106. Squaring circuits 1100 and 1102 each comprise power multipliers in which the inputs receive the same signal. Module 1104 also comprises a three input power multiplier. Half-wave amplitude detector 1106 is a rectifier circuit that only produces an output signal when the input signal is greater than zero in magnitude.

Squaring circuit 1100 receives and squares the signal of the intermediate frequency $f_{IF}$ output from frequency synthesizer 710. Squaring circuit 1102 squares the signal output from multiplier 1100. The outputs from squaring circuits 1100 and 1102 and the output from frequency synthesizer 710 are multiplied by multiplier 1104. The purpose of squaring the signal twice and then multiplying the results of squaring and also multiplying the result by the input signal is to get the signal of the special wave (or shape) illustrated in FIG. 12. The signal is formed so that there is a part that is a positive impulse with a porosity or porousness of 8, i.e., with period equal to the period of the IF signal and a duration close to half of the period of the $4^{th}$ harmonic of the IF signal from which it is obtained. In other words, the ratio of the time duration of the positive portion of the signal output from multiplier 1104 to the period of the signal is preferably equal to 8.

Figure 12:
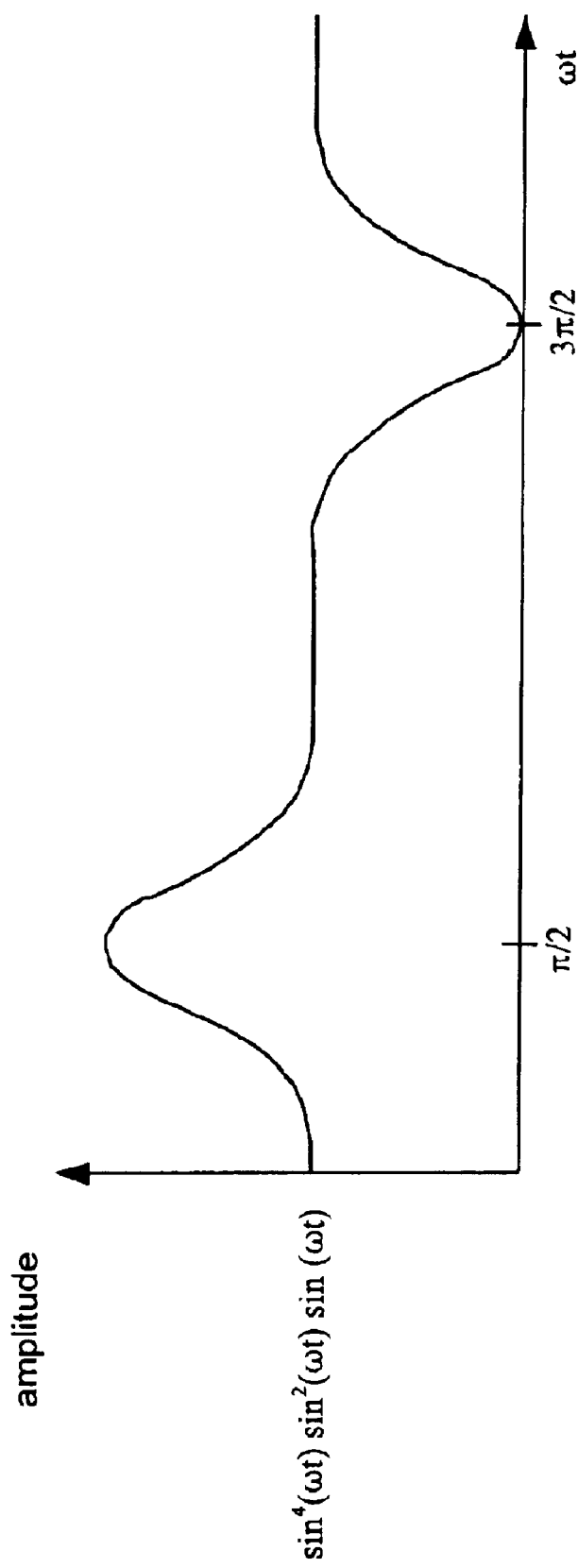
FIG. 12 is a graph illustrating the signal output from the comparison signal generation circuit illustrated in FIG. 11.

FIG. 12 illustrates the signal output from multiplier 1104. The resulting signal can be represented by the expression:

$$\sin^4(\omega t)\sin^2(\omega t)\sin(\omega t)$$

Such signal is necessary for the phase and frequency discriminator 708, which receives the output from both phase shifter 704 and comparison signal formation circuit 706.

The signal illustrated in FIG. 12 is then half-wave rectified by half wave amplitude detector circuit 1106 to remove all negative portions of the signal. In this manner, the required signal is formed. The signal is then input to the control input of the frequency and phase discriminator 708.

Figure 13:
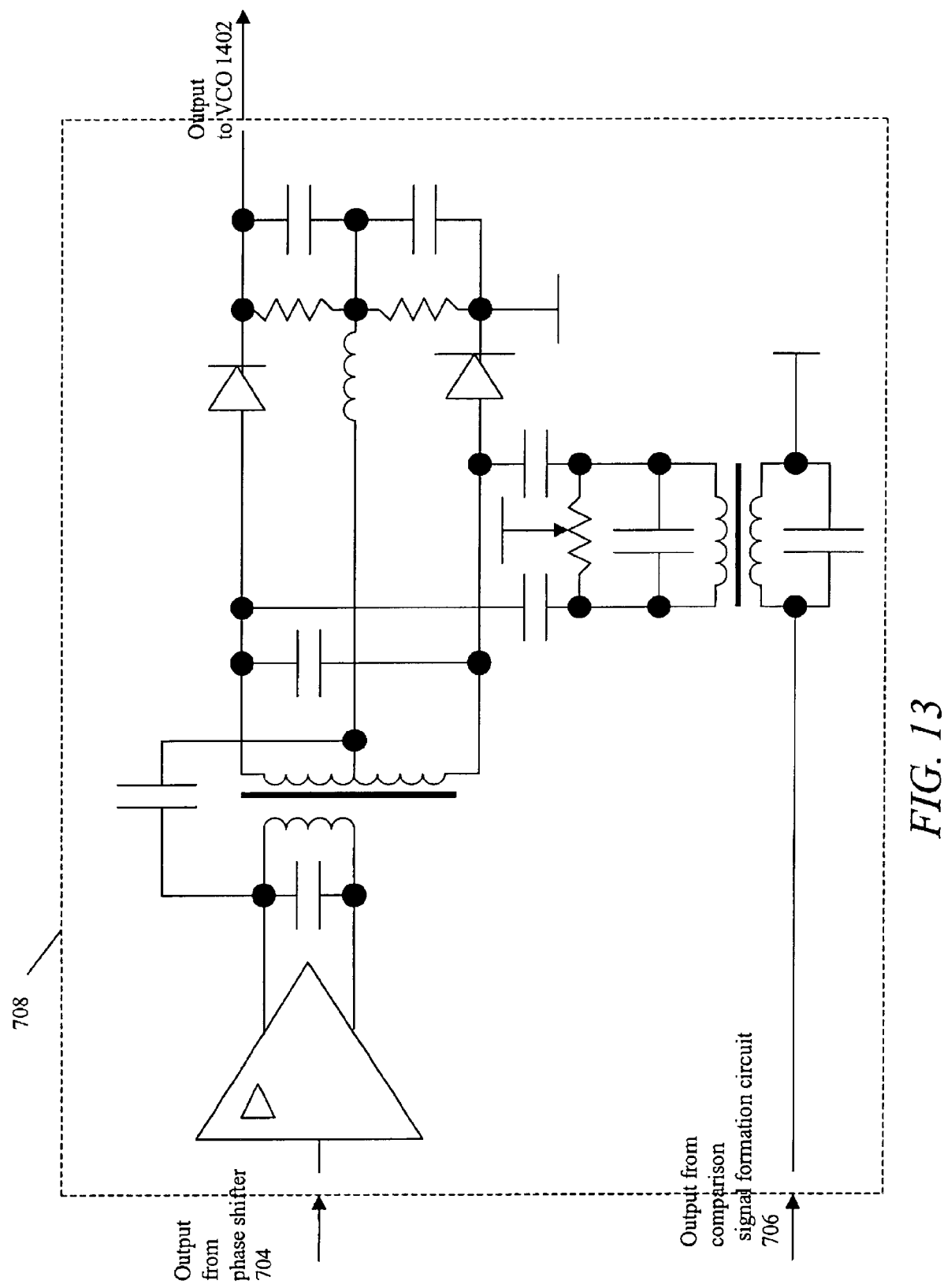
FIG. 13 is a schematic diagram of a frequency and phase discriminator suitable for use with the phase modulation spread spectrum receiver illustrated in FIG. 7.

FIG. 13 is a schematic diagram of an exemplary frequency and phase discrimination circuit suitable for use with the receiver illustrated in FIG. 7. In the illustrated embodiment, frequency and phase discriminator circuit 708 receives the signals output from phase shifter 704 and comparison signal formation circuit 706 and compares the signal input from module 704, which is the result of processing of the input quadrature phase modulated signal at the intermediate frequency, with the reference signal from the output of module 706. As a result of the comparison, an error signal is obtained at the output of frequency and phase discrimination circuit 708. The error signal is used for frequency adjustment of the signal output from the VCO of regulated oscillators module 408a, so that the signal output from frequency synthesizer 710 has the intermediate frequency and is in synchronization with the signal output from mixer 404.

In the illustrated example, frequency and phase discrimination circuit 708 can be built according to the frequency-phase discriminator diagram based on the Foster—Sili frequency discriminator with reference frequency oscillations as an input. The operation of such a frequency and phase discriminator is described in V. Manassevitsch, *Frequency Synthesizers: Theory & Design*, New York, London, Sydney, Toronto (1979), the disclosure of which is incorporated herein by reference in its entirety.

Figure 14:
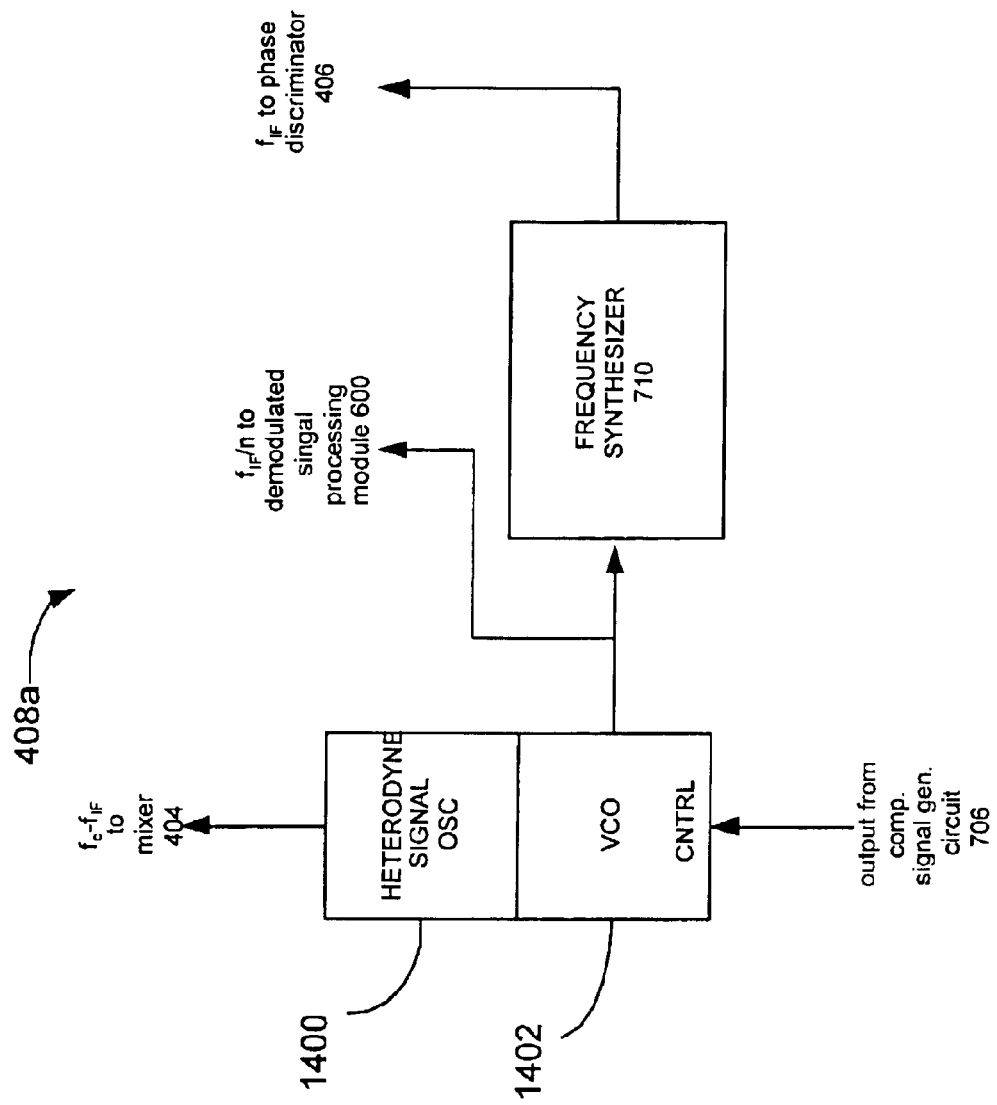
FIG. 14 is a block diagram of a regulated oscillators module suitable for use with the phase modulation spread spectrum receiver illustrated in FIG. 7.

FIG. 14 is a block diagram illustrating an exemplary regulated oscillators module suitable for use with a phase modulation spread spectrum receiver according to an embodiment of the present invention. In FIG. 14, regulated oscillators module 408a includes a heterodyne signal oscillator 1400, a voltage controlled oscillator 1402, and a frequency synthesizer 710. Heterodyne signal generator 1400 generates an output signal having a frequency equal to the difference between the carrier frequency of the received signal and the intermediate frequency. This signal is output to mixer 404 to be mixed with the received signal and produce a signal having the intermediate frequency. Voltage controlled oscillator 1402 receives the control signal from frequency and phase discriminator 708 and outputs a signal having the intermediate frequency $f_{IF}$ divided by n ($f_{IF}/n$). This signal having a frequency of $f_{IF}/n$ is output to the frequency synthesizer 710 and demodulated signal processing module 600. The frequency $f_{IF}$ from the frequency synthesizer 710 is output to the phase discriminator 406 to be mixed with the IF-converted signal output from mixer 404, as discussed above.

Frequency synthesizer 710 receives the frequency signal $f_{IF}/n$ output from VCO 1402 of regulated oscillators module 408a and produces a signal having the intermediate frequency. The synchronization frequency $f_{IF}/n$ of demodulated signal processing module 600, which is output from VCO 1402, is a multiple of the frequency of the information elements in the received signal and depends on the manner of signal processing in module 600 and on its type. The frequency $f_{IF}/n$ can be equal to the chipping rate or a multiple of the chipping rate. Frequency synthesizer 710 can be, for example, a typical multiplier based on a voltage-controlled oscillator with a phase lock loop (PLL) system, where the comparison frequencies are the oscillator frequency divided using counters and the frequency of the output signal from frequency synthesizer 710.

Because the intermediate frequency signal output from frequency synthesizer 710 of regulated oscillators module 408a is controlled based on a frequency multiplied version of the input signal, the intermediate frequency signal remains stable and in sync with the transmitter carrier oscillator. Accordingly, reliable demodulation can occur.

It will be understood that various details of the invention may be changed without departing from the scope of the invention. Furthermore, the foregoing description is for the purpose of illustration only, and not for the purpose of limitation—the invention being defined by the claims.

What is claimed is:

1. A quadrature phase modulation receiver for a spread spectrum communications system, the receiver comprising:

(a) a mixer for mixing a received spread spectrum signal with a heterodyne signal to convert the frequency of the received spread spectrum signal to an intermediate frequency and thereby produce a received signal having the intermediate frequency, the received spread spectrum signal including a carrier signal modulated by a data signal and being spread by a spreading code;

(b) a regulated oscillators module coupled to the mixer for producing the heterodyne signal and an intermediate frequency signal;

(c) a frequency multiplier coupled to the mixer for receiving the received signal having the intermediate frequency and multiplying the frequency of the received signal having the intermediate frequency by a fixed multiplication factor to produce a frequency multiplied signal, wherein the frequency-multiplied signal has a phase that does not depend on a phase of the data signal, wherein the frequency multiplied signal produced by the frequency multiplier is characterized by the following expression:

$$(\cos(4\omega t + 4\phi))/2,$$

where $\omega$ is the frequency of the received signal having the intermediate frequency and $\phi$ is the initial phase of the received signal having the intermediate frequency; and (d) means for producing an oscillator control signal based on the frequency multiplied signal output from the frequency multiplier, wherein the regulated oscillators module produces the intermediate frequency signal based on the oscillator control signal.

2. The quadrature phase modulation receiver of claim 1 comprising:

(e) a phase discriminator for receiving the signal output from the mixer and the intermediate frequency signal and producing a signal indicative of transmitted data and a spreading code; and (f) a demodulator for receiving the signal output from the phase discriminator and removing the spreading code.

3. The quadrature phase modulation receiver of claim 2 wherein the demodulator comprises a frequency hopping spread spectrum demodulator.

4. The quadrature phase modulation receiver of claims 2 wherein the demodulator comprises a direct sequence spread spectrum demodulator.

5. The quadrature phase modulation receiver of claim 1 wherein the regulated oscillators module comprises:

a heterodyne signal oscillator for producing the heterodyne signal;

a voltage controlled oscillator (VCO) for producing an output signal having a predetermined relationship with the intermediate frequency; and a frequency synthesizer for receiving the output signal from the VCO and for producing the intermediate frequency signal.

6. The quadrature phase modulation receiver of claim 5 wherein the voltage controlled oscillator is adapted to receive the oscillator control signal and produce the output signal based on the oscillator control signal.

7. A quadrature phase modulation receiver for a spread spectrum communications system, the receiver comprising:

(a) a mixer for mixing a received spread spectrum signal with a heterodyne signal to convert the frequency of the received spread spectrum signal to an intermediate frequency and thereby produce a received signal having the intermediate frequency;

(b) a regulated oscillators module coupled to the mixer for producing the heterodyne signal and an intermediate frequency signal;

(c) a frequency multiplier coupled to the mixer for receiving the received signal having the intermediate frequency and multiplying the frequency of the received signal having the intermediate frequency by a predetermined multiplication factor to produce a frequency multiplied signal; and (d) means for producing an oscillator control signal based on the frequency multiplied signal output from the frequency multiplier, wherein the regulated oscillators module produces the intermediate frequency signal based on the oscillator control signal, wherein the means for producing the oscillator control signal comprises:

(i) a phase shifter coupled to the frequency multiplier for receiving the frequency multiplied signal and shifting the phase of the frequency multiplied signal by a predetermined amount to produce an output signal;

(ii) a comparison signal formation circuit for receiving the intermediate frequency signal output from the regulated oscillators module and for producing an output signal having a predetermined relationship with the intermediate frequency signal; and (iii) a frequency and phase discriminator for receiving the output signals from the phase shifter and the comparison signal formation circuit and for producing the oscillator control signal based on the output signals from the phase shifter and the comparison signal formation circuit.

8. The quadrature phase modulation receiver of claim 7 wherein the comparison signal formation circuit comprises first and second squaring circuits and a multiplier circuit connected in series for receiving and processing the intermediate frequency signal output from the regulated oscillators module.

9. The quadrature phase modulation receiver of claim 8 wherein:

the first squaring circuit comprise a first voltage multiplier-having first and second inputs connected to each other and having a first output;

the second squaring circuit comprises a second voltage multiplier having third and fourth inputs connected to each other and to the first output and having a second output; and the multiplier circuit comprises a three-input multiplier having a first input coupled to the first output, a second input coupled to the second output, and a third input coupled to the regulated oscillators module.

10. A quadrature phase modulation receiver for a spread spectrum communications system, the receiver comprising:

(a) a mixer for mixing a received spread spectrum signal with a heterodyne signal to convert the frequency of the received spread spectrum signal to an intermediate frequency and thereby produce a received signal having the intermediate frequency;

(b) a regulated oscillators module coupled to the mixer for producing the heterodyne signal and an intermediate frequency signal;

(c) a frequency multiplier coupled to the mixer for receiving the received signal having the intermediate frequency and multiplying the frequency of received signal having the intermediate frequency by a predetermined multiplication factor to produce a frequency multiplied signal; and (d) means for producing an oscillator control signal based on the frequency multiplied signal output from the frequency multiplier, wherein the regulated oscillators module produces the intermediate frequency signal based on the oscillator control signal, wherein the received signal is a quadrature phase modulated signal and the frequency multiplier is a 4× frequency multiplier, and wherein the 4× frequency multiplier comprises:

(i) a first multiplier for squaring the received signal output from the mixer to produce a squared signal;

(ii) a first DC blocking capacitor for removing DC offset components from the squared signal;

(iii) a second multiplier for squaring the squared signal to produce a third output signal having a frequency that is four times the frequency of the intermediate frequency signal; and (iv) a second DC blocking capacitor coupled to the second multiplier for removing DC components from the third output signal to produce the frequency multiplied signal.

11. A method for maintaining synchronization between a quadrature phase modulation spread spectrum transmitter and a quadrature phase modulation spread spectrum receiver, the method comprising:

at the quadrature phase modulation spread spectrum receiver:

(a) receiving a quadrature phase modulated spread spectrum signal;

(b) mixing the quadrature phase modulated spread spectrum signal with a heterodyne signal to produce an intermediate frequency signal;

(c) removing the influence of data changes in the quadrature phase modulated spread spectrum signal from the intermediate frequency signal to produce an oscillator control signal, wherein removing the influence of data changes in the quadrature phase modulated spread spectrum signal from the intermediate frequency signal includes multiplying a frequency of the intermediate frequency signal by a fixed multiplication factor and wherein removing the influence of data changes in the quadrature phase modulated spread spectrum signal from the intermediate frequency signal includes producing the intermediate frequency signal characterized by the following equation:

$$(\cos(4\omega t+4\phi))/2,$$

where $\omega$ is the frequency of the intermediate frequency signal and $\phi$ is the initial phase of the intermediate frequency signal;

(d) generating a synchronization signal based on the oscillator control signal; and (e) demodulating the quadrature phase modulated spread spectrum signal using the synchronization signal.

12. The method of claim 11 wherein demodulating the quadrature phase modulated spread spectrum signal includes outputting the quadrature phase modulated spread spectrum signal to a frequency hopping spread spectrum demodulator.

13. The method of claim 11 wherein demodulating the quadrature phase modulated spread spectrum signal includes outputting the quadrature phase modulated spread spectrum signal to a direct sequence spread spectrum demodulator.

14. A method for maintaining synchronization between a quadrature phase modulation spread spectrum transmitter and a quadrature phase modulation spread spectrum receiver, the method comprising:

at the quadrature phase modulation spread spectrum receiver:

(a) receiving a quadrature phase modulated spread spectrum signal;

(b) mixing the quadrature phase modulated spread spectrum signal with a heterodyne signal to produce an intermediate frequency signal;

(c) removing the influence of data changes in the quadrature phase modulated spread spectrum signal from the intermediate frequency signal to produce an oscillator control signal, wherein removing influence of data changes in the quadrature phase modulated spread spectrum signal from the intermediate frequency signal includes multiplying the frequency of the intermediate frequency signal by a predetermined multiplication factor, wherein multiplying the frequency of the intermediate frequency signal by the predetermined multiplication factor includes multiplying the intermediate frequency signal by a factor of four to produce a frequency multiplied signal, wherein producing the oscillator control signal includes:

(i) shifting the phase of the frequency multiplied signal by a predetermined amount to produce a phase-shifted signal; and (ii) producing the oscillator control signal based on the phase-shifted signal;

(d) generating a synchronization signal based on the oscillator control signal; and (e) demodulating the quadrature phase modulated spread spectrum signal using the synchronization signal.

15. The method of claim 11 wherein generating the synchronization signal comprises generating a signal having a frequency equal to the frequency of the intermediate frequency signal based on the oscillator control signal.

16. A method for maintaining synchronization between a quadrature phase modulation spread spectrum transmitter and a quadrature phase modulation spread spectrum receiver, the method comprising:

at the quadrature phase modulation spread spectrum receiver:

(a) receiving a quadrature phase modulated spread spectrum signal;

(b) mixing the quadrature phase modulated spread spectrum signal with a heterodyne signal to produce an intermediate frequency signal;

(c) removing the influence of data changes in the quadrature phase modulated spread spectrum signal from the intermediate frequency signal to produce an oscillator control signal, wherein removing influence of data changes in the quadrature phase modulated spread spectrum signal from the intermediate frequency signal includes multiplying the frequency of the intermediate frequency signal by a predetermined multiplication factor, wherein multiplying the frequency of the intermediate frequency signal by the predetermined multiplication factor includes multiplying the intermediate frequency signal by a factor of four to produce a frequency multiplied signal, wherein multiplying the frequency of the intermediate frequency signal by the factor of four includes:

(i) squaring the intermediate frequency signal to produce a squared signal;

(ii) filtering out constant components from the squared signal;

(iii) squaring the squared signal to produce a signal having a frequency equal to four times the frequency of the intermediate frequency signal; and (iv) filtering out constant components from the signal having the frequency equal to four times the frequency of the intermediate frequency signal;

(d) generating a synchronization signal based on the oscillator control signal; and (e) demodulating the quadrature phase modulated spread spectrum signal using the synchronization signal.

17. A computer program product comprising computer-executable instructions embodied in a computer-readable medium for performing steps comprising:

(a) receiving a quadrature phase modulated spread spectrum signal;

(b) mixing the quadrature phase modulated spread spectrum signal with a heterodyne signal to produce an intermediate frequency signal;

(c) removing the influence of data changes in the quadrature phase modulated spread spectrum signal from the intermediate frequency signal to produce an oscillator control signal, wherein removing the influence of data changes in the quadrature phase modulated spread spectrum signal from the intermediate frequency signal includes multiplying a frequency of the intermediate frequency signal by a fixed multiplication factor and wherein removing the influence of data changes in the quadrature phase modulated spread spectrum signal from the intermediate frequency signal includes producing the intermediate frequency signal characterized by the following equation:

$$(\cos(4\omega t + 4\phi))/2,$$

where $\omega$ is the frequency of the intermediate frequency signal and $\phi$ is the initial phase of the intermediate frequency signal;

(d) generating a synchronization signal based on the oscillator control signal; and (e) demodulating the quadrature phase modulated spread spectrum signal using the synchronization signal.

18. The computer program product of claim 17 wherein demodulating the quadrature phase modulated spread spectrum signal includes outputting the quadrature phase modulation spread spectrum signal to a frequency hopping spread spectrum demodulator.

19. The computer program product of claim 17 wherein demodulating the quadrature phase modulated spread spectrum signal includes outputting the quadrature phase modulation spread spectrum signal to a direct sequence spread spectrum demodulator.

20. A computer program product comprising computer-executable instructions embodied in a computer-readable medium for performing steps comprising:

at a quadrature phase modulation spread spectrum receiver:

(a) receiving a quadrature phase modulated spectrum signal;

(b) mixing the quadrature phase modulated spectrum signal with a heterodyne signal to produce an intermediate frequency signal;

(c) removing the influence of data changes in the quadrature phase modulated spread spectrum signal from the intermediate frequency signal to produce an oscillator control signal, wherein removing the influence of data changes in the quadrature phase modulated spread spectrum signal from the intermediate frequency signal includes multiplying the frequency of the intermediate frequency signal by a predetermined multiplication factor, wherein multiplying the frequency of the intermediate frequency signal by the predetermined multiplication factor includes multiplying the intermediate frequency signal by a factor of four to produce a frequency multiplied signal; wherein producing the oscillator control signal includes:

(i) shifting the phase of the frequency multiplied signal by a predetermined amount to produce a phase-shifted signal; and (ii) producing the oscillator control signal based on the phase-shifted signal;

(d) generating a synchronization signal based on the oscillator control signal; and (e) demodulating the quadrature phase modulated spread spectrum signal using the synchronization signal.

21. The computer program product of claim 20 wherein generating the synchronization signal comprises generating a signal having a frequency equal to the frequency of the intermediate frequency signal based on the oscillator control signal.

22. A computer program product comprising computer-executable instructions embodied in a computer-readable medium for performing steps comprising:

at a quadrature phase modulation spread spectrum receiver:

(a) receiving a quadrature phase modulated spectrum signal;

(b) mixing the quadrature phase modulated spectrum signal with a heterodyne signal to produce an intermediate frequency signal;

(c) removing the influence of data changes in the quadrature phase modulated spread spectrum signal from the intermediate frequency signal to produce an oscillator control signal, wherein removing the influence of data changes in the quadrature phase modulated spread spectrum signal from the intermediate frequency signal includes multiplying the frequency of the intermediate frequency signal by a predetermined multiplication factor, wherein multiplying the frequency of the intermediate frequency signal by the predetermined multiplication factor includes multiplying the intermediate frequency signal by a factor of four to produce a frequency multiplied signal; wherein multiplying the frequency of the intermediate frequency signal by the factor of four includes:

(i) squaring the intermediate frequency signal to produce a squared signal;

(ii) filtering out constant components from the squared signal;

(iii) squaring the squared signal to produce a signal having a frequency equal to four times the frequency of the intermediate frequency signal, and (iv) filtering out constant components from the signal having a frequency equal to four times the frequency of the intermediate frequency signal;

(d) generating a synchronization signal based on the oscillator control signal; and (e) demodulating the quadrature phase modulated spread spectrum signal using the synchronization signal.

* * * * *